United States Patent [19]

Murashima et al.

[11] Patent Number: 4,853,788

[45] Date of Patent: Aug. 1, 1989

[54] AUTOMATIC FOCUSING CIRCUIT SELECTIVELY USING MULTIPLE FOCUS EVALUATING CURVES HAVING DIFFERING CHARACTERISTICS

[75] Inventors: Hirotsugu Murashima, Yamatotakada; Satoru Maeda, Hirakata, both of Japan

[73] Assignee: Sanyo Electric Co., Ltd., Osaka, Japan

[21] Appl. No.: 155,900

[22] Filed: Feb. 16, 1988

[30] Foreign Application Priority Data

| Feb. 18, 1987 | [JP] | Japan | 62-34764 |
| Feb. 18, 1987 | [JP] | Japan | 62-34766 |
| Mar. 4, 1987 | [JP] | Japan | 62-49512 |

[51] Int. Cl.$^4$ .................................... H04N 5/232
[52] U.S. Cl. ................................ 358/227; 358/225
[58] Field of Search ............... 358/227, 225, 55; 250/201

[56] References Cited

U.S. PATENT DOCUMENTS 4,414,575  11/1983  Yamamoto et al. .............. 358/227

FOREIGN PATENT DOCUMENTS 161579   9/1983  Japan .
212080  11/1984  Japan .
41277    2/1986  Japan .
60369    3/1987  Japan .
199174   9/1987  Japan .

Primary Examiner—James J. Groody
Assistant Examiner—Robert M. Bauer
Attorney, Agent, or Firm—Peter L. Michaelson

[57] ABSTRACT

In an automatic focusing circuit of a video camera, an automatic focusing operation is performed in response to a first focus evaluating value which is steeply changed and a second focus evaluating value which is gently changed, in response to the position of a lens, in which the first and second focus evaluation values are generated in response to a video signal obtained in an image sensing circuit 4. When a comparator 28 determines that the first focus evaluating value does not reach a predetermined reference value, a in-focus state detecting circuit 24 and a focusing motor control circuit 10 perform an intermittent automatic focusing operating every other field in response to the second focus evaluating value. When the comparator 28 determines that the first focus evaluating value exceeds the perdetermined reference value, the in-focus state detecting circuit 24 and the focusing motor control circuit 10 perform an automatic focusing operation more frequently every field in response to the first focus evaluating value. The moment a change of an object is detected after the object is in focus, the automatic focusing operation is resumed in response to the second focus evaluating value.

13 Claims, 10 Drawing Sheets

AUTOMATIC FOCUSING CIRCUIT SELECTIVELY USING MULTIPLE FOCUS EVALUATING CURVES HAVING DIFFERING CHARACTERISTICS

BACKGROUND OF THE INVENTION

1. Field of the Invention

The present invention relates to an automatic focusing circuit and more particularly, to an improvement of an automatic focusing circuit for automatically matching the focus relative to an object in response to a video signal obtained from an image sensor, in an image sensing apparatus such as a video camera and an electronic still camera having an automatic focusing mechanism.

2. Description of the Prior Art

Conventionally, in an automatic focusing apparatus used in an image sensing apparatus such as a video camera and an electronic still camera, an approach has been developed for utilizing a video signal itself obtained from an image sensor for evaluating the state in which the focus is to be controlled has According to such an approach, many good characteristics can be obtained. For example, there exists substantially no parallax. In addition, even if the depth of field is small and an object is located in the distance, the focus can be exactly matched. Furthermore, according to this approach, a specific sensor for automatic focusing need not be separately provided, so that the apparatus is very simple as a mechanism.

As an example of such a focus control method utilizing a video signal, a control method referred to as a so-called hill-climbing servo system has been conventionally known. The hill-climbing servo system is described in, for example, U.S. Pat. No. 4,638,364, U.S. Pat. No. 4,614,975, Japanese Patent Laying-Open Gazettes No. 58505/1983 and No. 103776/1985. Briefly stated, a high frequency component of a video signal obtained from an image sensor is detected every one field as a focus evaluating value, the detected focus evaluating value is always compared with a focus evaluating value detected one field before, and the position of a focusing lens continues to be slightly vibrated so that the focus evaluating value always takes the maximal value.

In the above described hill-climbing servo system, if only the slope of a focus evaluating value is detected, the focusing lens is not stopped in the defocused position by driving the focusing lens in the direction of always increasing the focus evaluating value even if the object is changed, so that very good follow-up characteristics can be achieved.

However, such a hill-climbing servo system suffers from the following significant disadvantages caused by continuing to vibrate the position of the focusing lens.

A first disadvantage is that since the focusing lens is not stopped even in the in-focus state, a picture continues to be vibrated even if an object at rest is in focus. For example, the focal length of a lens currently used in a television camera is changed by rotating a focusing ring, so that the angle of field of a recorded image is changed. Therefore, in the above described system in which the focusing ring continues to be vibrated even in the in-focus state, an object on the picture becomes large or small with a particular cycle, resulting in a very unclear picture.

A second disadvantage is directed to a power consumption. There are many cases where a home video camera currently utilizes a battery as a power supply due to the portability thereof. When a focusing motor is always driven as in the above described hill-climbing servo system so that the forward rotation and the reverse rotation are repeated, more power is consumed, as compared with when the focusing motor is rotated in a constant direction, due to in-rush current, so that the time period during which an image can be recorded by using such a battery becomes short.

Additionally, since the focusing ring is always rotated, a problem of wear of a gear occurs, for example.

An automatic focusing circuit to solve these problems is proposed by one of the inventors of the present invention, which is disclosed in Japanese Patent Application No. 273212 filed Nov. 17, 1986.

FIG. 1 is a schematic block diagram showing the proposed automatic focusing circuit, and FIG. 2 is a block diagram showing the details of a focus evaluating value generating circuit shown in FIG. 1.

Referring to FIG. 1, a video camera comprises a focusing ring 2 for moving a focusing lens 1, a focusing motor 3 for driving the focusing ring 2, and an image sensing circuit 4 including an image sensor (not shown) such as a CCD (Charge Coupled Device). The focusing lens 1 may be moved by a piezoelectric element instead of a motor. In addition, the image sensor (not shown) itself such as the CCD instead of the focusing lens may be moved by the piezoelectric element.

An image formed on a surface of the image sensor by the focusing lens 1 is converted into a video signal by the image sensing circuit 4 and inputted to the focus evaluating value generating circuit 5. Referring to FIG. 2 showing the details of the focus evaluating value generating circuit 5, a luminance signal component in a video signal outputted from the image sensing circuit 4 is applied to a synchronizing separator circuit 5a and a gate circuit 5c. The synchronizing separator circuit 5a separates a vertical synchronizing signal VD and a horizontal synchronizing signal HD from the inputted luminance signal and applies the same to a gate control circuit 5b. The gate control circuit 5b sets a rectangular sampling area in a central portion of a picture in response to the inputted vertical synchronizing signal VD and horizontal synchronizing signal HD and a fixed output of an oscillator (not shown). The gate control circuit 5b applies a signal for opening or closing a gate every field to the gate circuit 5c so that passage of the luminance signal is permitted only in the range of the sampling area. The gate circuit 5c may be provided anywhere in the former stage of an integration circuit 5f as described below.

Only the luminance signal corresponding to the range of the sampling area is applied to a high-pass filter 5d every field by the gate circuit 5c. The high frequency component of the video signal separated by the high-pass filter 5d is amplitude-detected by a detector 5e, the detected output being applied to the integration circuit 5f. The integration circuit 5f integrates every field the detected output applied thereto, the integrated output being applied to an A/D converter 5g. The A/D converter 5g converts the integrated value inputted thereto into a digital value and supplies the digital value as a focus evaluating value in the current field.

Description is now made on operation to occur immediately after automatic focusing control is started. Immediately after an automatic focusing operation is started, a focus evaluating value of the first one field outputted from the focus evaluating value generating circuit 5 is first applied to a memory 6 holding the maximum value and a memory 7 holding the initial value and is held therein. Thereafter, a focusing motor control circuit 10 rotates the focusing motor 3 in a predetermined direction. Thereafter, a comparator 9 compares the initial focus evaluating value held in the initial value memory 7 with the current focus evaluating value outputted from the focus evaluating value generating circuit 5 and generates a comparison signal. Accordingly, the focusing motor control circuit 10 initializes the rotational direction of the focusing motor 3 in response to the comparison signal.

More specifically, the focusing motor control circuit 10 rotates the focusing motor 3 in the above described predetermined direction until the comparator 9 generates a comparison output indicating "large" or "small". If and when a comparison output indicating that the current focus evaluating value is larger than the initial focus evaluating value held in the initial value memory 7 is outputted from the comparator 9, the focusing motor control circuit 10 maintains the above described predetermined rotational direction. On the other hand, when a comparison output indicating that the current focus evaluating value is smaller than the initial focus evaluating value is obtained, the focusing motor control circuit 10 reverses the rotational direction of the focusing motor 3.

In the above described manner, initialization of the rotational direction of the focusing motor 3 is completed. Thereafter, the focusing motor control circuit 10 monitors an output of a comparator 8. In order to prevent a malfunction due to noise of the focus evaluating value, the comparator 9 may be adapted not to generate the comparison output indicating "large" or "small" while the difference between the initial focus evaluating value and the current focus evaluating value does not exceed a predetermined threshold value.

On the other hand, the comparator 8 compares the maximum focus evaluating value so far held in the maximum value memory 6 with the current focus evaluating value outputted from the focus evaluating value generating circuit 5, and outputs two kinds of comparison signals (S1, S2), that is, signals in first and second modes in which the current focus evaluating value is larger than or is less than a predetermined threshold value, as compared with the focus evaluating value held in the maximum value memory 6, respectively. If and when the current focus evaluating value is larger than the contents of the maximum value memory 6, the content of the maximum value memory 6 is updated in response to the output S1 of the comparator 8, so that the maximum value of the focus evaluating value so far is always held in the maximum value memory 6.

A signal indicating the position of a focusing ring is generated from the focusing ring 2 corresponding to the position of the focusing ring 2 supporting the focusing lens 1 and applied to a memory 13 holding the position of a focusing ring. The focusing ring position memory 13 is updated in response to the output of the comparator 8 so that the focusing ring position signal in which the focus evaluating value becomes the maximum is always held.

The focusing motor control circuit 10 monitors the output of the comparator 8 while rotating the focusing motor 3 in the direction initialized in response to the output of the comparator 9 as described above. When the output S2 in the second mode in which the current focus evaluating value is decreased to be below the above described threshold value, as compared with the maximum focus evaluating value, is obtained from the comparator 8, the focusing motor control circuit 10 reverses the rotational direction of the focusing motor 3. It is to prevent a malfunction due to noise of the focus evaluating value that the focusing motor is not reversed until the current focus evaluating value is decreased to be below a predetermined threshold value.

After the focusing motor 3 is reversed, a comparator 14 compares the contents of the focusing ring position memory 13 corresponding to the maximum value of the focus evaluating value with the current focusing ring position signal generated from the focusing ring 2. When both coincide with each other, that is, the focusing ring 2 is returned to the position where the focus evaluating value is the maximum, the focusing motor control circuit 10 stops rotation of the focusing motor 3. At the same time, the focusing motor control circuit 10 outputs a lens stop signal LS. In the above described manner, a series of automatic focusing operations are completed.

A memory 11 and a comparator 12 are circuits for resuming an automatic focusing operation by the focusing motor control circuit 10 if the focus evaluating value is changed by more than a predetermined threshold value while the focusing lens is stopped. More specifically, a focus evaluating value at the time point when the automatic focusing operation by the focusing motor control circuit 10 is completed and the lens stop signal LS is generated is held in the memory 11. The comparator 12 compares the contents of the memory 11 with the current focus evaluating value outputted from the focus evaluating value generating circuit 5. If the difference therebetween exceeds the predetermined threshold value, it is considered that an object changed, so that a signal indicating that an object changed is applied to the focusing motor control circuit 10. As a result, the automatic focusing operation by the focusing motor control circuit 10 is resumed, so that an automatic focusing operation following the change of the object can be achieved.

FIGS. 3A, 3B, 4A, 4B, 5A and 5B are graphs showing the relation between the position of the focusing lens or the distance between the lens and the object and the focus evaluating value, respectively. In each of the drawings, an axis of abscissa represents the position of the focusing lens or the distance between the lens and the object, and an axis of ordinate represents the focus evaluating value. As can be seen from the above described drawings, the graph of the focus evaluating value generally is a mountain-like curve. The curve can be made gentle as shown in FIG. 3A or steep as shown in FIG. 3B by changing a constant of a circuit for generating the focus evaluating value, for example, the cut-off frequency of the high-pass filter 5d shown in FIG. 2. The curve of the focus evaluating value directly affects significantly the automatic focusing operation as described below. More specifically, (1) if the curve is gentle as shown in FIG. 3A, a focus evaluating value of a certain degree of magnitude is obtained even if the lens is significantly displaced from the in-focus position A and an object is defocused, so that reliable hill-climbing control can be achieved.

On the other hand, if the distance between the lens and the object is changed when a particular object is in focus as shown in FIG. 4A, the focus evaluating value is decreased as represented by an arrow in FIG. 4A.

However, the decrease is relatively slight. Thus, the decrease cannot be distinguished from the decrease (represented an arrow in FIG. 5A) caused by the change of brightness and lateral movement of the object as shown in FIG. 5A, so that there occurs a problem in continuous automatic focusing operations. More specifically, in the case shown in FIG. 4A, the automatic focusing operation must be resumed. In the case shown in FIG. 5A, the automatic focusing operation need not be resumed. However, here, if only the focus evaluating value is monitored, then both of the above described cases cannot be distinguished. Thus, it is assumed that the automatic focusing operation is resumed if the focus evaluating value is decreased to such a degree. When the state as shown in FIG. 5A occurs, the automatic focusing operation is resumed although it need not be resumed, so that a picture fluctuates. On the other hand, it is assumed that the automatic focusing operation is not resumed if the focus evaluating value is decreased to such a degree. When the state shown in FIG. 4A occurs, the automatic focusing operation is not resumed although it must be resumed, so that a picture remains blurred.

(2) on the other hand, if the curve is steep as shown in FIG. 3B, the above described malfunction does not occur. More specifically, the decrease (represented by an arrow in FIG. 4B) of the focus evaluating value shown if the distance between the lens and the object is changed when a particular object is in focus as shown in FIG. 4B is sufficiently larger than the decrease (represented by an arrow in FIG. 5B) of the focus evaluating value caused by the change of brightness and lateral movement of the object as shown in FIG. 5B. Thus, the above described both cases can be distinguished by observing the focus evaluating value, so that the automatic focusing operation can be resumed as required.

However, on the other hand, since the slope of the focus evaluating value is very small in a base portion of the mountain-like curve, the direction to move the lens cannot be determined if an object is significantly defocused. As a result, the lens continues to move in the reverse direction. In addition, if the lens moves in the correct direction, then the direction of the slope of the curve of the focus evaluating value many change due to noise and slight change of the focus evaluating value, so that the lens begins to move in the reverse direction. Consequently, the automatic focusing operation becomes extremely unstable.

In an automatic focusing camera of a conventional hill-climbing servo system, the focus evaluating value of an intermediate curve between the curve of FIG. 3A and the curve of FIG. 3B is used, so as to minimize these problems. However, the shape of the curve of the focus evaluating value is changed depending on the nature and brightness of the object and the focal length of the lens, so that one of the above described problems (1) and (2) is revealed according to circumstances, whereby a malfunction may occur.

Japanese Utility Model Laying-Open Gazette No. 72967/1986 discloses an automatic focusing circuit in which an output of a first filter having a high first cut-off frequency (for example, 600 KHz) and an output of a second filter having a low second cut-off frequency (100 KHz) both receiving a video signal corresponding to a set sampling area are selectively used to generate a signal for hill-climbing servo control. More specifically, until a signal obtained by detecting the output of the first filter attains a predetermined level, an automatic focusing operation is performed using a signal obtained by detecting the output of the second filter and then, using a signal obtained by detecting the output of the first filter. According to such an automatic focusing circuit, the above described unstable automatic focusing operation can be prevented to a certain degree.

However, in such an automatic focusing circuit, since the level is determined based on a detected output which is an analogue signal, the problem occurs as described below. FIGS. 6A and 6B are diagrams showing diagrammatically a first detected output corresponding to a sampling area in one field, respectively. In each of the drawings, an axis of abscissa represents the time, an axis of ordinate represents the magnitude of an analogue signal obtained by detecting the output of the first filter in one field, and a dotted line represents a threshold value. As shown in FIG. 6A, when the first detected output exceeds the threshold value, correct automatic focusing control is performed by the first detected output. As shown in FIG. 6B, when the first detected output does not reach the threshold value, an automatic focusing operation is performed by a second detected output. However, in FIGS. 6A and 6B, there is no large difference in a high frequency component included in a video signal. Thus, if the level is determined based on such a detected output as it is, a stable automatic focusing operation cannot be performed.

SUMMARY OF THE INVENTION

Therefore, a primary object of the present invention is to provide an automatic focusing circuit in which few malfunctions occur and an automatic focusing operation can be performed with an extremely high accuracy.

Another object of the present invention is to provide an automatic focusing circuit in which a stable automatic focusing operation can be performed even under a special condition for recording an image.

Briefly stated, the present invention is directed to an automatic focusing circuit for automatically matching the focus in response to a video signal obtained from image sensing means, the automatic focusing circuit comprising first focus evaluating value detecting means for detecting a level of a high frequency component of the video signal every constant time period, converting the level into a first focus evaluating value which is steeply changed in response to the change of the relative position of a focusing lens and supplying the same, second focus evaluating value detecting means for converting the level into a second focus evaluating value which is gently changed and supplying the same, first control means responsive to the first focus evaluating value for controlling the relative position of the focusing lens, and second control means responsive to the second focus evaluating value for controlling the relative position of the focusing lens. When the first focus evaluating value does not reach a predetermined reference value, an automatic focusing operation is performed by the second control means in response to the second focus evaluating value. Thereafter, the first focus evaluating value reaches the predetermined reference value and then, an automatic focusing operation is performed by the first control means in response to the first focus evaluating value.

In accordance with another aspect of the present invention, the automatic focusing circuit comprises switching means for alternately selecting the first control means and the second control means in a constant cycle. When the first focus evaluating value does not reach the predetermined reference value, an automatic focusing operation is intermittently performed by the second control means selected by the switching means. After the first focus evaluating value reaches the predetermined reference value, the switching means selects only the first control means, so that an automatic focusing operation is performed more frequently in response to the first focus evaluating value.

In accordance with still another aspect of the present invention, when an automatic focusing operation is resumed after the in-focus state is achieved, the switching means always selects the second control means, so that the automatic focusing operation is resumed.

In accordance with yet another aspect of the present invention, the automatic focusing circuit comprises means for determining that an object is in a dark place. When it is determined that the object is in a dark place, the switching means always selects the second control means, so that an automatic focusing operation is performed.

A principal advantage of the present invention is that an automatic focusing operation is performed in response to a focus evaluating value of a curve having a steep shape when a structure of a bright and complicated object is recorded and an automatic focusing operation is performed in response to a focus evaluating value of a curve having a gentle shape if an image is recorded in a dark place and a structure of an obscure object is recorded, so that an extremely stable automatic focusing operation can be performed as a whole.

Another advantage of the present invention is that when an object is changed after the object is in focus, so that an automatic focusing operation is performed, the automatic focusing operation is always performed in response to the second focus evaluating value, so that movement of the object can be followed at a high speed.

Still another advantage of the present invention is that if an image is recorded in a dark place, an automatic focusing operation is automatically resumed in response to the second focus evaluating value, so that few malfunctions occurs.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 7:
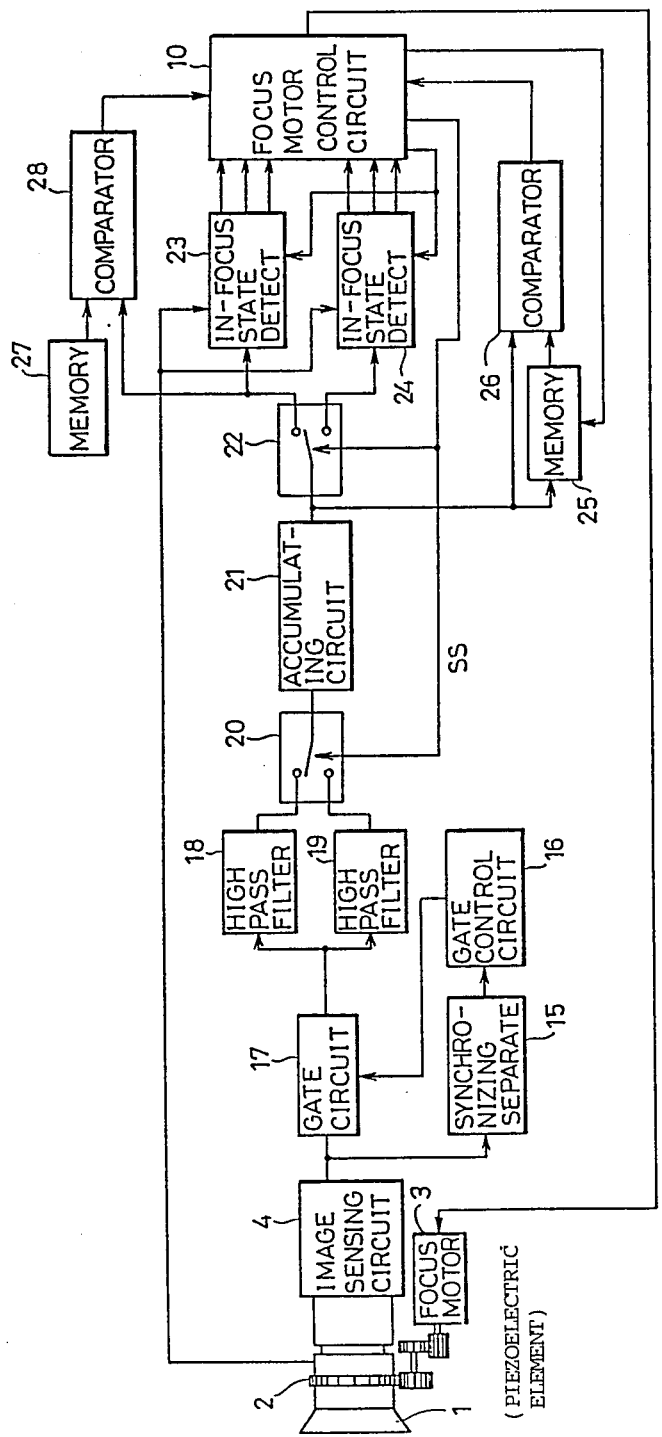
FIG. 7 is a schematic block diagram showing an automatic focusing circuit according to an embodiment of the present invention.

FIG. 7 is a schematic block diagram showing an automatic focusing circuit according to an embodiment of the present invention.

Referring now to FIG. 7, description will now be made of automatic focusing circuit according to an embodiment of the present invention. In FIG. 7, a video camera comprises a focusing ring 2 for moving a focusing lens 1, a focusing motor 3 for driving the focusing ring 2, and an image sensing circuit 4 including an image sensor (not shown) such as a CCD, as in the conventional example shown in FIG. 1. The focusing lens 1 may be moved by a piezoelectric element instead of a motor. In addition, the image sensor (not shown) itself such as the CCD instead of the focusing lens may be moved by the piezoelectric element. An image formed on the image sensor by the focusing lens 1 is converted into a luminance signal by the image sensing circuit 4 and applied to a synchronizing separator circuit 15 and a gate circuit 17. The synchronizing separator circuit 15 corresponds to the synchronizing separator circuit 5a included in the conventional focus evaluating value generating circuit 5 shown in FIG. 2, and separates a vertical synchronizing signal VD and the horizontal synchronizing signal HD from an inputted luminance signal and applies the same to a gate control circuit 16. The gate control circuit 16 corresponds to the gate control circuit 5b included in the focus evaluating value generating circuit 5 shown in FIG. 2, and is responsive to the inputted vertical synchronizing signal VD and horizontal synchronizing signal HD and a fixed output of an oscillator (not shown) for setting a sampling area in the center of a picture. The gate control circuit 16 applies a signal for opening or closing a gate every field to the gate circuit 17 so that passage of the luminance signal is permitted in the range of the sampling area. The gate circuit 17 corresponds to the gate circuit 5c included in the focus evaluating value generating circuit 5 shown in FIG. 2, and is responsive to the signal from the gate control circuit 16 for applying only a luminance signal corresponding to the range of the sampling area to first and second filter circuits 18 and 19 every field. Both the first and second filter circuits 18 and 19 correspond to the high-pass filter 5d included in the conventional focus evaluating value generating circuit 5 shown in FIG. 2, and extracts only a high frequency component of the luminance signal supplied from the image sensing circuit 4 through the gate circuit 17. The first filter circuit 18 has a higher cut-off frequency, as compared with the second filter circuit 19. According to the present embodiment, it is assumed that the cut-off frequency of the first filter circuit 18 is set to 500 KHz and the cut-off frequency of the second filter circuit 19 is set to 100 KHz, for example. Either one of outputs of the first and second filter circuits 18 and 19 is selected by a switching circuit 20 controlled by a focusing motor control circuit 10 and applied to an accumulating circuit 21. The accumulating circuit 21 corresponds to the detecting circuit 5e, the integration circuit 5f and the A/D converter 5g included in the focus evaluating value generating circuit 5 shown in FIG. 2. In other words, the synchronizing separator circuit 15, the gate control circuit 16, the gate circuit 17, the first filter circuit 18 and the accumulating circuit 21 constitute a first focus evaluating value generating circuit. On the other hand, the synchronizing separator circuit 15, the gate control circuit 16, the gate circuit 17, the second filter circuit 19 and the accumulating circuit 21 constitutes a second focus evaluating value generating circuit.

As described above, since the cut-off frequency of the first focus evaluating value generating circuit is higher than that of the second focus evaluating value generating circuit, a mountain-like curve of a focus evaluating value outputted from the first focus evaluating value generating circuit has a steeper shape, as compared with that of a focus evaluating value outputted from the second focus evaluating value generating circuit. Another approach of making a shape of a mountain-like curve of the focus evaluating value steeper involves cutting an output of the image sensing circuit 4 by a DC bias and then, integrating the result. This approach has an effect in removing a noise level. However, this approach has little effect on an object including no high frequency component. For such a reason, the present embodiment uses an approach of changing the cut-off frequency of the filter.

Furthermore, in order to produce two kinds of focus evaluating values, it is preferable that two independent focus evaluating value generating circuits are employed. However, when the shape of the curve of the focus evaluating value is gentle, the change between the extracted evaluating values is small even if the values are intermittently extracted, which is disclosed in the above described Japanese Utility Model Laying-Open Gazette No. 72967/1986, and the accumulating circuit 21 is common to both the focus evaluating values generating circuits. For the foregoing reasons, it is sufficient that the signals are alternately extracted in a constant cycle, as shown in FIG. 7. The cycle of extracting the signal from each of the focus evaluating value generating circuits may be theoretically an arbitrary cycle. However, considering that the gate is opened or closed every field, so that a luminance signal is extracted as described above, it is appropriate that the switching circuit is switched every one field.

An output of the accumulating circuit 21 is inputted to a switching circuit 22. The switching circuit 22 is switched in response to a signal from the focusing motor control circuit 10, similarly to the switching circuit 20. As a result, the outputs of the first focus evaluating value generating circuit and the second focus evaluating value generating circuit are inputted to a first in-focus state detecting circuit 23 and a second in-focus state detecting circuit 24, respectively.

Figure 8:
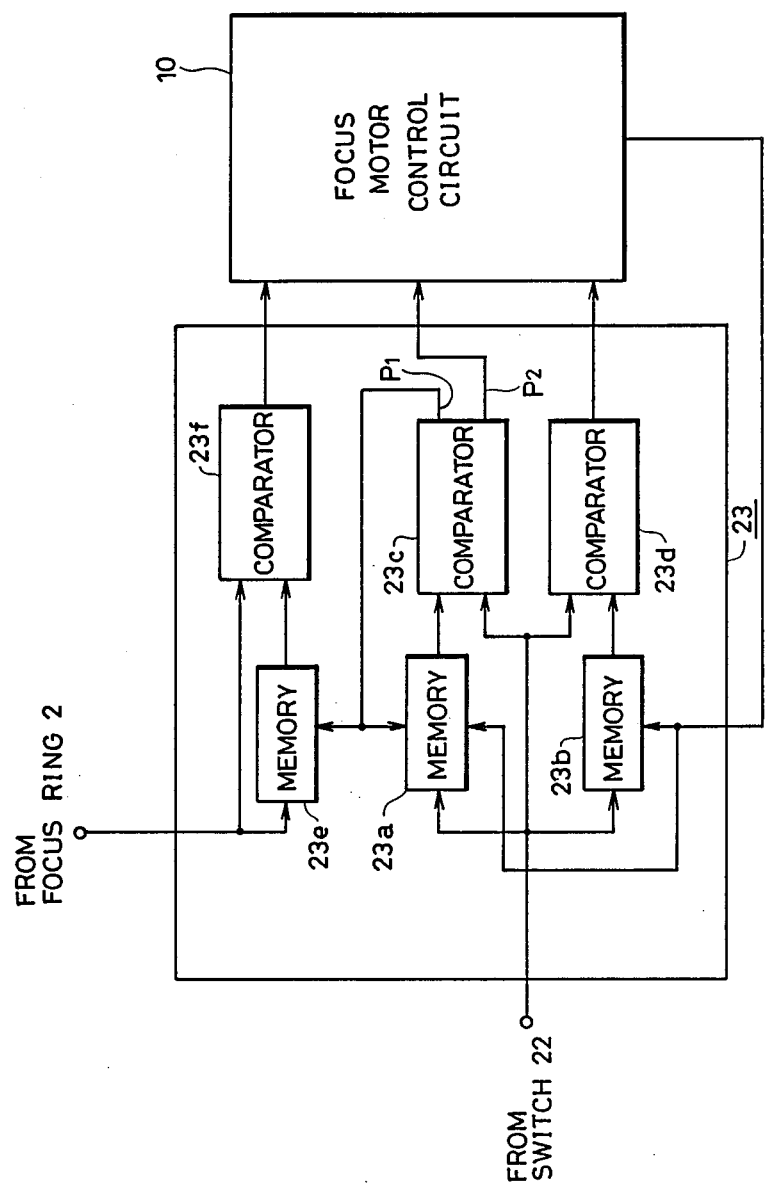
FIG. 8 is a block diagram showing the details of an in-focus state detecting circuit shown in FIG. 7.

The first in-focus state detecting circuit 23 and the second in-focus state detecting circuit 24 have basically the same structure, which is shown in FIG. 8. More specifically, the in-focus state detecting circuit 23 or 24) comprises a maximum value memory 23a, an initial value memory 23b, a comparator 23c, a comparator 23d, a focusing ring position memory 23e and a comparator 23f, which correspond to the maximum value memory 6, the initial value memory 7, the comparator 8, the comparator 9, the focusing ring position memory 13 and the comparator 14, respectively, constituting the conventional automatic focusing circuit shown in FIG. 1. An operation of the in-focus state detecting circuit 23 (or 24) is clear from the description of the above described automatic focusing circuit shown in FIG. 1. Briefly stated, immediately after the automatic focusing operation is started, a focus evaluating value of the first one field supplied from the accumulating circuit 21 through the switch 22 is applied to the maximum value memory 23a and the initial value memory 23b in the in-focus state detecting circuit 23 and held therein. Then, the focusing motor control circuit 10 rotates the focusing motor 3 in a predetermined direction. Thereafter, the comparator 23d compares an initial focus evaluating value held in the initial value memory 23b with the newest focus evaluating value outputted from the accumulating circuit 21 and generates a comparison signal. Accordingly, the focusing motor control circuit 10 initializes the rotational direction of the focusing motor 3.

More specifically, the focusing motor control circuit 10 rotates the focusing motor 3 in the above described predetermined direction until the comparator 23d generates a comparison output indicating "large" or "small". If the comparison output indicating that the newest focus evaluating value is larger than the initial focus evaluating value held in the initial value memory 23b is outputted from the comparator 23d, the focusing motor control circuit 10 maintains the above described predetermined rotational direction. On the other hand, if the comparison output indicating that the current focus evaluating value is smaller than the initial focus evaluating value, the focusing motor control circuit 10 reverses the rotational direction of the focusing motor 3. In the above described manner, initialization of the rotational direction of the focusing motor 3 is completed. Thereafter, the focusing motor control circuit 10 monitors an output of the comparator 23c.

On the other hand, the comparator 23c compares the maximum focus evaluating value so far held in the maximum value memory 23a with the newest focus evaluating value outputted from the accumulating circuit 21, and outputs two kinds of signals, that is, a comparison signal P1 indicating that the current focus evaluating value is "larger" than the focus evaluating value held in the maximum value memory 23a and a comparison signal P2 indicating that the current focus evaluating value is "decreased to be below a predetermined threshold value". If the newest focus evaluating value is larger than the content of the maximum value memory 23a, the content of the maximum value memory 23a is updated in response to the output of the comparator 23c, so that the maximum value of the focus evaluating values so far is held in the maximum value memory 23a.

On the other hand, a focusing ring position signal generated from the focusing ring 2 is applied to the focusing ring position memory 23e. The focusing ring position memory 23e is updated to always hold a focusing ring position signal obtained when the focus evaluating value is the maximum, in response to the output of the comparator 23c.

The focusing motor control circuit 10 monitors the output of the comparator 23c while rotating the focusing motor 3 in the direction initialized in response to the output of the comparator 23d as described above. When the comparison output P2 indicating that the newest focus evaluating value is decreased to exceed the above described threshold value, as compared with the maximum focus evaluating values is obtained from the comparator 23c, the focusing motor control circuit 10 reverses the rotational direction of the focusing motor 3.

After the focusing motor 3 is reversed, the contents of the focusing ring position memory 23e corresponding to the maximum value of the focus evaluating value and the current focusing ring position signal generated from the focusing ring 2 are compared with each other in the comparator 23f. When both coincide with each other, that is, the focusing ring 2 is returned to the position where the focus evaluating value is the maximum, the focusing motor control circuit 10 stops rotation of the focusing motor 3. At the same time, the focusing motor control circuit 10 outputs a lens stop signal LS.

The second in-focus state detecting circuit 24 has the same structure as that of the above described first in-focus state detecting circuit 23. However, since the magnitude of focus evaluating values inputted to both the in-focus state detecting circuits are entirely different from each other as described above, two kinds of in-focus state detecting circuits can not be achieved by sharing a single in-focus state detecting circuit.

Figure 1:
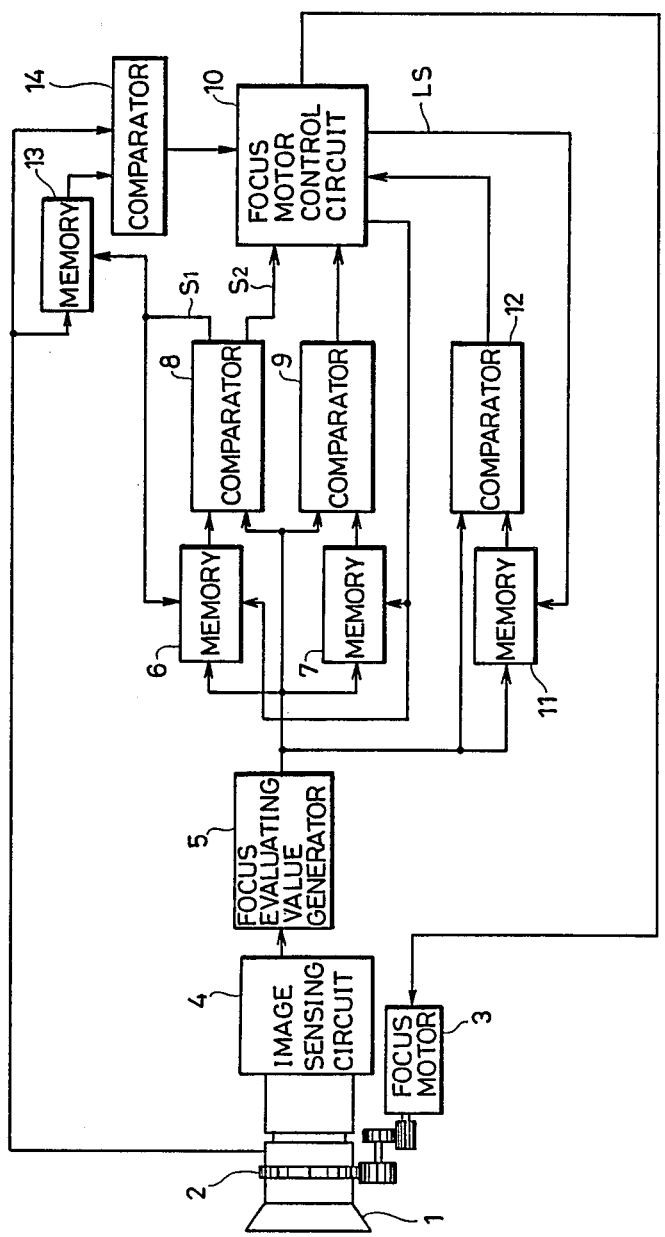
FIG. 1 is a schematic block diagram showing an example of a conventional automatic focusing circuit.
Figure 2:
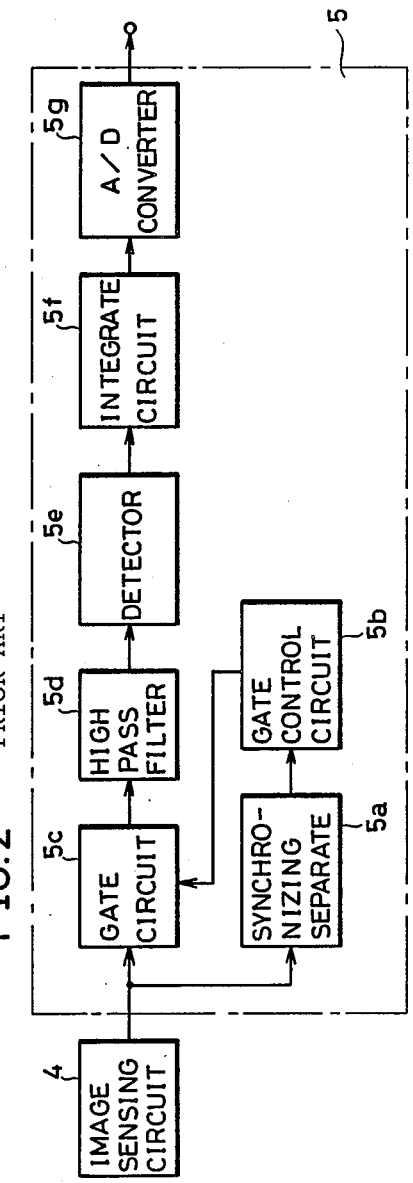
FIG. 2 is a block diagram showing the details of a focus evaluating value generating circuit shown in FIG. 1.
Figure 6A:
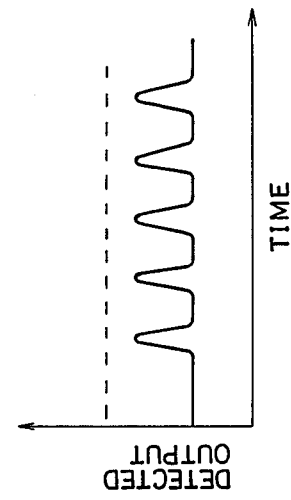
FIGS. 6A and 6B are waveform diagrams showing diagrammatically a detected output corresponding to a sampling area in one field.
Figure 6B:
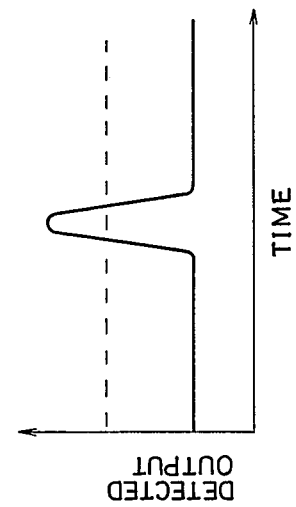
Figure 3A:
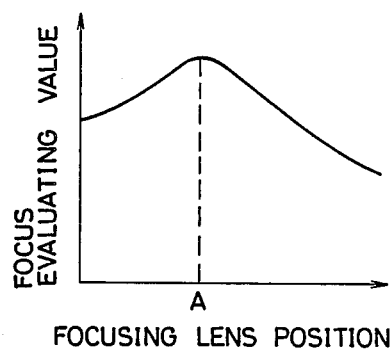
FIGS. 3A, 3B, 4A, 4B, 5A and 5B are graphs showing the relation between the position of the focusing lens and the focus evaluating value.
Figure 3B:
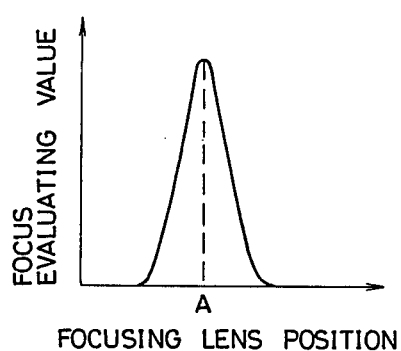
Figure 4A:
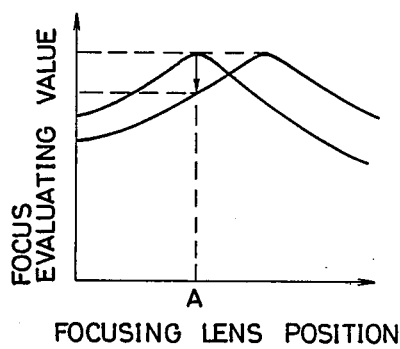
Figure 4B:
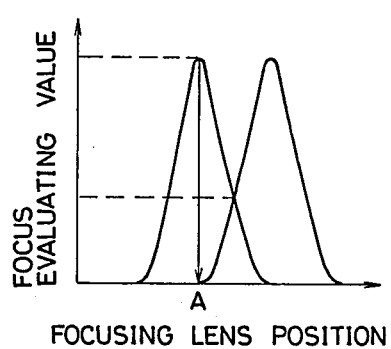
Figure 5A:
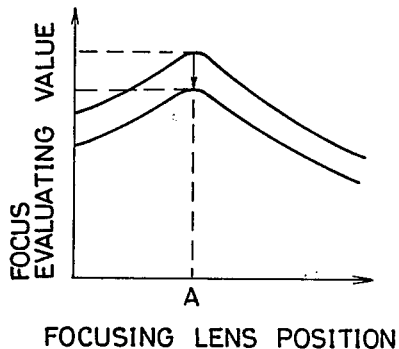
Figure 5B:
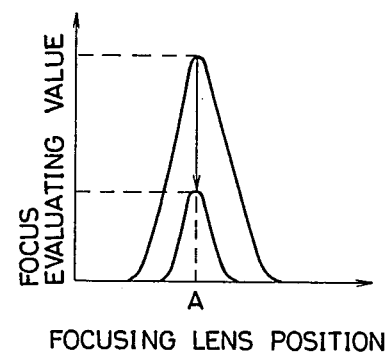

Furthermore, a memory 25 and a comparator 26, which correspond to the memory 11 and the comparator 12 shown in FIG. 1, are used for resuming an automatic focusing operation by the focusing motor control circuit 10 if the focus evaluating value is changed to exceed a predetermined threshold value while the focusing lens is stopped. More specifically, a focus evaluating value at the time point when the automatic focusing operation by the focusing motor control circuit 10 is completed and the lens stop signal LS is generated is held in the memory 25. The comparator 26 compares the contents of the memory 25 with the newest focus evaluating value outputted from the accumulating circuit 21. If the difference therebetween exceeds a predetermined threshold value, it is considered that an object changed, so that a signal indicating that an object change is applied to the focusing motor control circuit 10. As a result, the automatic focusing operation by the focusing motor control circuit 10 is resumed, so that the automatic focusing operation following the change of the object is achieved. Thus, the first in-focus state detecting circuit 23 and second in-focus state detecting circuit 24 can independently perform an in-focus state detecting operation.

On the other hand, the focus evaluating value of a curve having a steep shape applied to the first in-focus state detecting circuit 23 through the switch 22 from the first focus evaluating value generating circuit is also applied to the comparator 28 and compared with a predetermined digital reference value outputted from a reference value generating circuit 27. As a result of comparison, if the output of the first focus evaluating value generating circuit is smaller, the comparator 28 generates a signal at an "L" level and applies the same to the focusing motor control circuit 10. In addition, if the output of the first focus evaluating value generating circuit is larger, the comparator 28 generates a signal at an "H" level and applies the same to the focusing motor control circuit 10.

When the focusing motor control circuit 10 receives the signal at the "L" level from the comparator 28, the focusing motor control circuit 10 performs an automatic focusing operation in response to only an output of the second in-focus state detecting circuit 24, that is, the focus evaluating value of a curve having a gentle shape outputted from the second focus evaluating value detecting circuit while switching the switching circuits 20 and 22 in a cycle of one field. On the other hand, when it receives the signal at the "H" level, the focusing motor control circuit 10 switches the switching circuits 20 and 22 to select the first focus evaluating value generating circuit and performs an automatic focusing operation in response to only an output of the first in-focus state detecting circuit 23, that is, the focus evaluating value of a curve having a steep shape outputted from the first focus evaluating value generating circuit.

Thus, according to the embodiment shown in FIG. 7, if the output of the first focus evaluating value generating circuit is smaller than the predetermined reference value, an automatic focusing operation is performed every other field, that is, every one field by the output of the second focus evaluating value detecting circuit. However, when the shape of a curve of the focus evaluating value is gentle as described above, the change of detected focus evaluating values is slight even if the focus evaluating values are intermittently detected, so that hill-climbing servo control can be performed with a sufficiently high accuracy.

On the other hand, if the output of the first focus evaluating value detecting circuit is larger than the reference value, the shape of a curve in the vicinity of the maximum value of the focus evaluating value is extremely steep, so that it is desirable that hill-climbing servo control is performed more frequently. According to the present embodiment, in such a case, an automatic focusing operation is performed in all fields in response to the output of the first focus evaluating value detecting circuit, so that hill-climbing servo control can be performed more frequently.

Figure 9A:
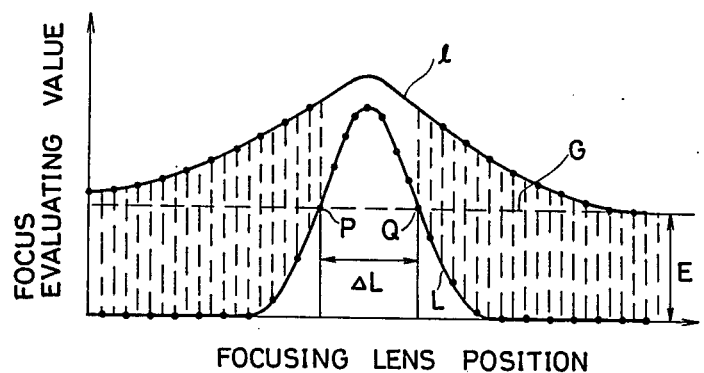
FIGS. 9A, 9B and 9C are graphs for explaining an operation according to the embodiment shown in FIG. 7.
Figure 9B:
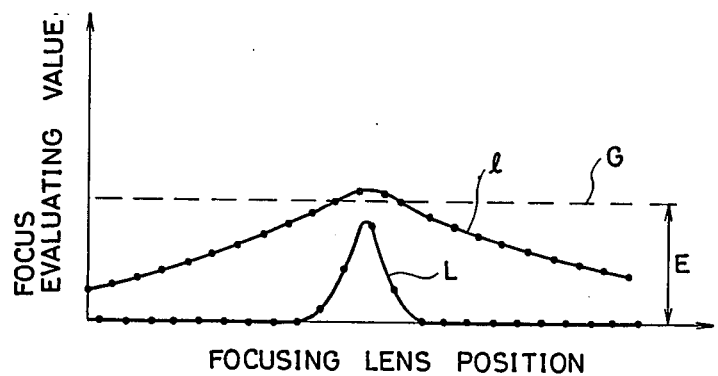
Figure 9C:
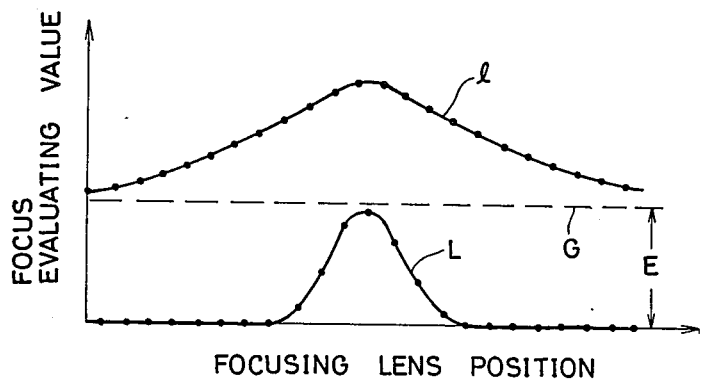

FIGS. 9A, 9B and 9C are graphs for explaining an operation according to the embodiment shown in FIG. 7. In each of the drawings, an axis of abscissa represents the position of the focusing lens, that is, the distance between the lens and the object, and an axis of ordinate represents the focus evaluating value. In addition, in each of the drawings, "L" denotes the output of the first focus evaluating value generating circuit, "l" denotes the output of the second focus evaluating value generating circuit and "G" denotes a reference value outputted from the reference value generating circuit 27. In each of the drawings, "." denotes diagrammatically the outputs of the first and second focus evaluating value generating circuits outputted every one field.

More specifically, FIG. 9A is a diagram showing the outputs of the first and second focus evaluating value generating circuits obtained when the ordinary object is recorded under ordinary conditions for recording an image. It is assumed that the focusing lens begins to be driven from the left end toward the right of FIG. 9A. Since the output "L" of the first focus evaluating value generating circuit is very small, the focus evaluating value is alternately detected by the first focus evaluating value generating circuit and the second focus evaluating value generating circuit, and an automatic focusing operation is performed every other field by only the output "l" of the second focus evaluating value generating circuit. When the output "L" of the first focus evaluating value generating circuit reaches the predetermined reference value "G" (at a point P), the second focus evaluating value generating circuit does not detect the focus evaluating value, so that hill-climbing servo control is performed more frequently by only the output "L" of the first focus evaluating value generating circuit. The focusing motor 3 is stopped at the crest of the mountain-like curve. In practice, the stopped state is maintained until the change of the focus evaluating value satisfies the condition for starting an automatic focusing operation. For easy understanding, description will be made on the case in which the automatic focusing operation is immediately resumed and, then, the focusing lens is driven. When the lens is further driven in the right direction, the value of the output "L" of the first focus evaluating value generating circuit is rapidly decreased and reaches the reference value "G" (at a point Q). Thereafter, the output of the first focus evaluating value generating circuit and the output of the second focus evaluating value generating circuit are obtained again, so that an automatic focusing operation is performed every other field by the output "l" of the second focus evaluating value generating circuit. More specifically, in FIG. 9A, in a section ΔL in which the output "L" of the first focus evaluating value generating circuit has a larger value than the reference value "G", hill-climbing servo control is performed more frequently. On the other hand, on either side of the section ΔL, that is, in the state in which the value of the output "L" of the first focus evaluating value generating circuit is decreased, so that the focus evaluating value is liable to be affected by noise, the automatic focusing operation is performed using the output "l" of the second focus evaluating value generating circuit in the state in which the focus evaluating value is immune to noise.

FIG. 9B is a diagram showing the case in which the obtained focus evaluating values are small as a whole, similarly to the case in which an image is recorded in a dark place. In the case of FIG. 9B, the output "L" of the first focus evaluating value generating circuit does not exceed the reference value "G", so that an automatic focusing operation is performed using only the output "l" of the second focus evaluating value generating circuit. More specifically, in such a case, the output "L" of the first focus evaluating value generating circuit includes a large noise component. Consequently, when an automatic focusing operation is performed using the output "L", a malfunction may be caused by noise. Thus, in the case shown in FIG. 9B, it is extremely appropriate that the automatic focusing operation is performed using only the output "l" of the second focus evaluating value generating circuit.

FIG. 9C is a diagram showing the case in which an object which is sufficiently bright as a whole but hardly generates a high frequency component in a video signal, for example, an object having no structure as an object such as a blue sky and a white wall is recorded. In such a case, the output "L" of the first focus evaluating value generating circuit does not exceed the reference value "G" as in the case shown in FIG. 9B, so that an automatic focusing operation is performed by only the output "l" of the second focus evaluating value generating circuit. More specifically, even if control is not performed more frequently as shown in FIG. 9A with respect to the above described blue sky and white wall, a sufficient accuracy can be preserved for practical use.

Thus, according to the embodiment of the present invention shown in FIG. 7, the automatic focusing operation responsive to the output of the two kinds of focus evaluating value generating circuits are automatically switched so that an automatic focusing operation is performed more frequently by the focus evaluating value of a curve having a steep shape if a structure of a bright and complicated object is recorded and an intermittent automatic focusing operation is performed by the focus evaluating value of a curve having a gentle shape if an image is recorded in a dark place and a structure of an obscure object is recorded. Consequently, a very stable automatic focusing operation can be achieved as a whole.

According to the above described embodiment shown in FIG. 7, the focusing motor control circuit 10 generally monitors the focus evaluating value of a curve having a steep shape from the first focus evaluating value generating circuit in the ordinary in-focus state. In consideration of the case in which the change of the focus evaluating value is detected so that the automatic focusing operation is resumed, the focus evaluating value rapidly reaches a base portion of the mountain-like curve and becomes almost 0 only by slight movement of the focusing lens. In such a case, if at the time of resuming the automatic focusing operation, a malfunction occurs, then the automatic focusing operation is resumed after an object is significantly defocused, for example.

According to the second embodiment of the present invention, an automatic focusing operation, immediately after its resumption is always performed in response to the output of the second focus evaluating value generating circuit of a curve having a gentle shape. The structure of the second embodiment is the same as that of the embodiment shown in FIG. 7 and hence, the illustration thereof is omitted. According to the second embodiment, the comparator 26 compares the newest focus evaluating value outputted from the accumulating circuit 21 with the focus evaluating value held in the memory 25. When he difference therebetween exceeds a predetermined threshold value, the comparator 26 applies a signal to the focusing moor control circuit 10. Accordingly, the focusing motor control circuit 10 generates a switching circuit control signal SS in response to the signal to control the switching circuits 20 and 22. More specifically, if the in-focus state has been achieved in response to the output of the first focus evaluating value generating circuit, the switching circuits 20 and 22 ar switched so that the automatic focusing operation responsive to the output of the second focus evaluating value generating circuit is performed. If the in-focus state has not been achieved in response to the output of the second focus evaluating value generating circuit, the automatic focusing operation responsive to the output of the second focus evaluating value generating circuit is performed with switching circuits 20 and 22 remaining in the present switching state. More specifically, whichever contact in the switching circuits 20 and 22 are selected to at the time point when the in-focus state is achieved so that the automatic focusing operation by the first focus evaluating value generating circuit or the second focus evaluating value generating circuit is completed, the switching circuits 20 and 22 are unconditionally switched to the side in which an automatic focusing operation is performed by the output of the second focus evaluating value generating circuit. As a result, if the focus evaluating value is changed to exceed a predetermined value, an automatic focusing operation is always resumed by the output of the second focus evaluating value generating circuit having a gentle mountain-like curve.

When the automatic focusing operation is resumed, the focusing motor control circuit 10 performs the automatic focusing operation while switching both the switching circuits 20 and 22 in a cycle of one field until it is determined by the comparator 28 that the current output of the focus evaluating value generating circuit exceeds the reference value outputted from the reference value generating circuit 27. If the output exceeds the above described threshold value, the automatic focusing operation is performed in response to only the output of the first focus evaluating value generating circuit as in the above described first embodiment.

Figure 10A:
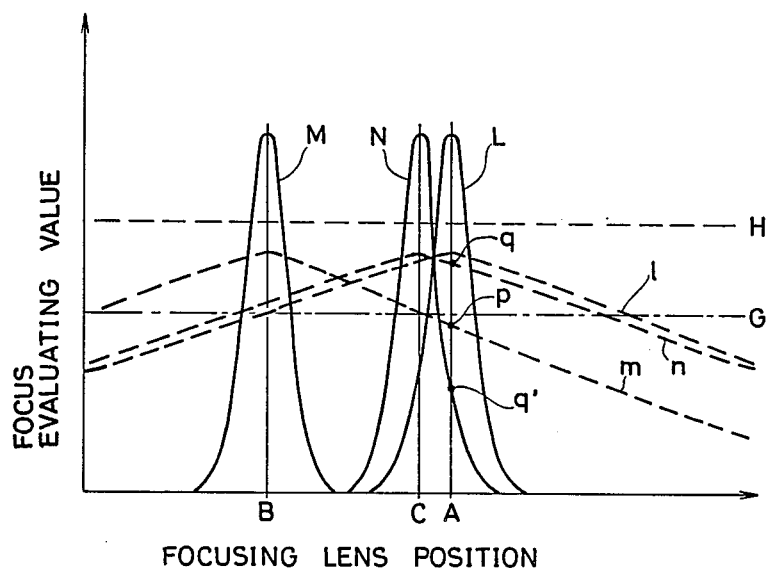
FIGS. 10A and 10B are graphs for explaining an operation according to another embodiment of the present invention.
Figure 10B:
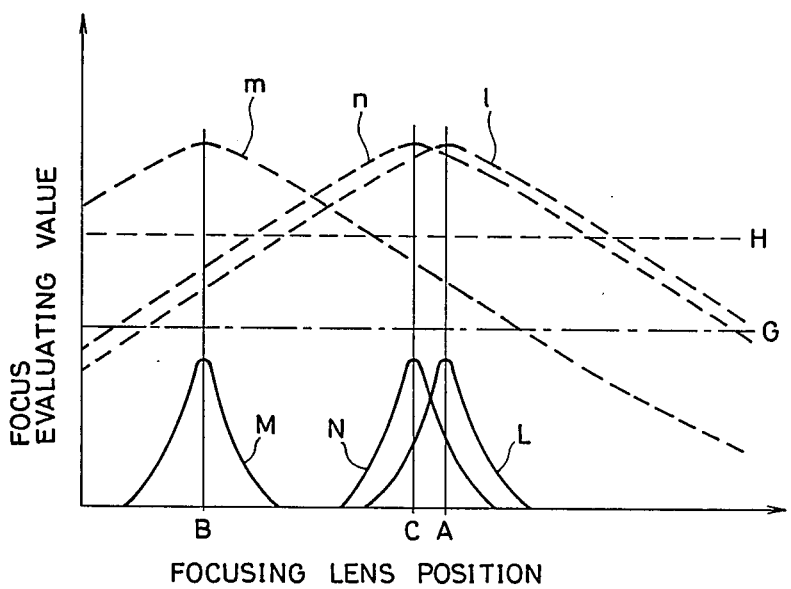

FIGS. 10A and 10B are diagrams for explaining an operation according to the second embodiment. In each of the drawings, an axis of the abscissa represents the position of the focusing lens, that is, the distance between the lens and the object and an axis of the ordinate represents the focus evaluating value. In addition, as in the above described FIGS. 9A to 9C, "L" denotes the output of the first focus evaluating value generating circuit, "l" denotes the output of the second focus evaluating value generating circuit and "G" denotes the reference value outputted from the reference value generating circuit 27. Furthermore, in FIGS. 10A and 10B, "H" denotes a threshold value of the comparator 26 for resuming the automatic focusing operation.

FIG. 10A is the case in which since the output of the first focus evaluating value generating circuit exceeds the reference value "G", the in-focus state is achieved by the output of the first focus evaluating value generating circuit. It is assumed that after the in-focus state is achieved in the position of the distance A between the lens and the object, the object changed, so that the curve "L" of the output of the first focus evaluating value generating circuit is changed to a curve represented by "M" and the curve "l" of the output of the second focus evaluating value generating circuit is changed to a curve represented by "m". At that time, since the position of the lens remains fixed at a point A, the output of the first focus evaluating value generating circuit, that is, the value of the curve "M" is 0. Consequently, when the automatic focusing operation is performed in response to the output of the first focus evaluating value generating circuit, the focusing motor control circuit 10 cannot designate the rotational direction of the motor, so that the focusing motor control circuit 10 continues to rotate the focusing motor 3 in the direction in which the motor begins to be rotated until it is determined that the focus evaluating value exceeds the reference value "G". Thus, if the initial direction of rotation of the focusing motor 3 at the time of resuming the automatic focusing operation is a direction of driving the focusing lens from the point A toward the left, there is no problem. If it is a direction of driving the lens toward the right, an object remains defocused until the lens reaches once an endpoint (an infinite-point in this example) and then, is inverted and returns to a point B, which is generally recognized as a malfunction.

However, as in the second embodiment, when the switching circuits are switched such that the automatic focusing operation is performed using the output of the second focus evaluating value generating circuit represented by the curve "m" at the time point when the focus evaluating value is below the threshold value "H", the focus evaluating value is detected in the position (at a point p) where the slope exists, so that the focusing motor control circuit 10 can immediately determine the correct rotational direction of the focusing motor. More specifically, the focusing motor control circuit 10 performs an intermittent automatic focusing operation in response to the output of the second focus evaluating value generating circuit represented by the curve "m". If the value of the output of the first focus evaluating value generating circuit represented by the curve "M" exceeds the reference value "G", the automatic focusing operation is performed more frequently in response to the output of the first focus evaluating value generating circuit.

As still another example, it is assumed that the object slightly changed, for example, the curve "L" of the output of the first focus evaluating value generating circuit is changed to a curve represented by "N" and the curve "l" of the output of the second focus evaluating value generating circuit is changed to a curve represented by "n". In this case, since the position of the lens is fixed at the point A, a corresponding value of the output "N" of the first focus evaluating value generating circuit is q' and a corresponding value of the output "n" of the second focus evaluating value generating circuit is q. In such a case, whichever curve of the curves N and n is used, the slope of the focus evaluating value can be confirmed. Apparently, it is considered that control can be performed with a higher accuracy if the output "N" of the first focus evaluating value generating circuit is used. However, the output of the first focus evaluating value generating circuit is liable to be affected by noise in such a low level, which causes a malfunction. Thus, even in such a case, it is appropriate that an automatic focusing operation is performed in response to the output "n" of the second focus evaluating value generating circuit and then, the automatic focusing operation is performed in response to the output "N" of the first focus evaluating value generating circuit at the time point when the output of the first focus evaluating value generating circuit exceeds the reference value "G". In addition, if a point C is near the point A and a focus evaluating value at the point q exceeds the reference value "G", there occurs no problem whichever output of the output "N" of the first focus evaluating value generating circuit and the output "n" of the second focus evaluating value generating circuit is used to detect the in-focus position, or rather it is considered that the output "N" of the first focus evaluating value generating circuit should be used. However, when the automatic focusing operation is performed in response to the output of the second focus evaluating value generating circuit, the output of the first focus evaluating value generating circuit and the output of the second focus evaluating value generating circuit are alternately outputted every one field, so that the automatic focusing operation is performed by only the output of the first focus evaluating value generating circuit one field after even if control responsive to the output of the second focus evaluating value generating circuit is selected and the amount of movement of the lens in such a case is extremely small. Consequently, even if the automatic focusing operation responsive to the output of the second focus evaluating value generating circuit is selected once, there occurs no problem for practical use.

FIG. 10B shows the case in which the output of the first focus evaluating value generating circuit does not exceed the reference value "G" and the in-focus state is achieved in response to the output of the second focus evaluating value generating circuit. It is assumed that the distance between the lens and the object is changed, so that curves "L" and "l" of the focus evaluating value are changed to the curves "M" and "m", respectively. In this case, since the value of the output "m" of the second focus evaluating value generating circuit at the position A of the lens is changed to a level below a threshold value "H" for resuming an automatic focusing operation, the comparator 26 applies a signal indicating that the change of an object is detected to the focusing motor control circuit 10 and rotates the focusing motor 3, so that the automatic focusing operation is resumed in response to the output "m" of the second focus evaluating value generating circuit. As described above, after resuming the automatic focusing operation, the values of the curves "M" and "m" are alternately detected every one field. If the value of the curve "M" exceeds the reference value "G", the automatic focusing operation is performed in response to the curve "M".

Additionally, as in the case shown in FIG. 10A, it is assumed that the curves "L" and "l" of the focus evaluating value are changed to the curves "N" and "n", respectively. In this case, it is clear that the focus evaluating value "n" is not changed to exceed the threshold value "H" for resuming an automatic focusing operation, so that the automatic focusing operation is not resumed. Consequently, when the initial in-focus state has been achieved in response to the output of the second focus evaluating value detecting circuit, it is clear that the automatic focusing operation is not resumed unless the distance between the lens and the object is considerably changed and the object is significantly defocused. It is considered that this is apparently a large problem. In practice, it is then an object such as a white wall which hardly changes is recorded that the in-focus state is achieved in response to the output of the second focus evaluating value generating circuit. Consequently, even if the object is slightly defocused, there is little problem in a picture for practical use. Thus, when the initial in-focus state is achieved in response to the output of the first focus evaluating value generating circuit, it is necessary to quickly follow the change of the object.

More specifically, in the state in which an image is actually recorded, it is when the distance between the object and the lens is considerably changed and the object itself is changed to another object that the automatic focusing operation must be resumed. In such a case, the focus evaluating value is generally changed considerably. Thus, it is extremely appropriate that immediately after the automatic focusing operation is resumed, the automatic focusing operation is performed in response to the output of the second focus evaluating value generating circuit.

As described in the foregoing, according to the second embodiment of the present invention, since the automatic focusing operation immediately after resumption thereof is performed using the output of the second focus evaluating value generating circuit of a curve having a gentle shape, the operation can follow the change of an object at a high speed without loosing sight of the object.

As described above, the above described embodiment shown in FIG. 7 is extremely effective in the ordinary state for recording an image. On the other hand, there occurs some problems under special conditions for recording an image.

More specifically, the output level of a video signal of a video camera is decreased when the luminance of an object is decreased, so that an object which is dark to more than a certain degree cannot be recorded. In order to cope with such a situation, the video camera is adapted such that the output level of the video signal is held at a constant level by an automatic gain control circuit (AGC) when the output level of the video signal is below a particular level.

On the other hand, when an image is recorded in a dark place, that is, in the state in which the illuminance of the object is low, not only the level of the video signal is decreased as described above but also the noise level is increased. Consequently, if the above described AGC circuit is employed, not only the signal level but also the noise level is equally amplified, so that the output of the first focus evaluating value generating circuit becomes extremely unstable and the curve thereof is not steep due to the large noise level.

Figure 11A:
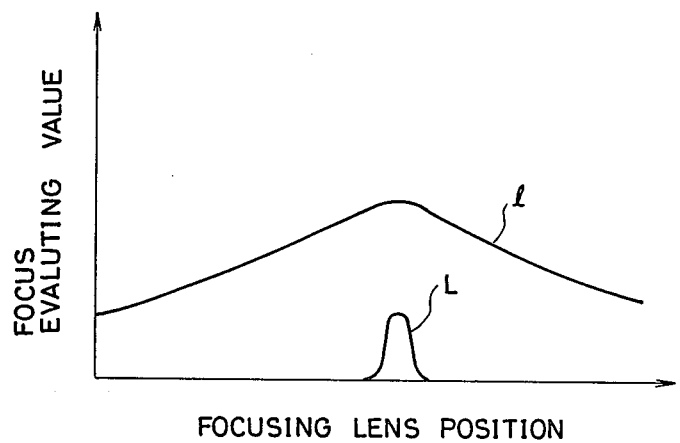
FIGS. 11A and 11B are graphs for explaining the state in which an image is recorded in a dark place.
Figure 11B:
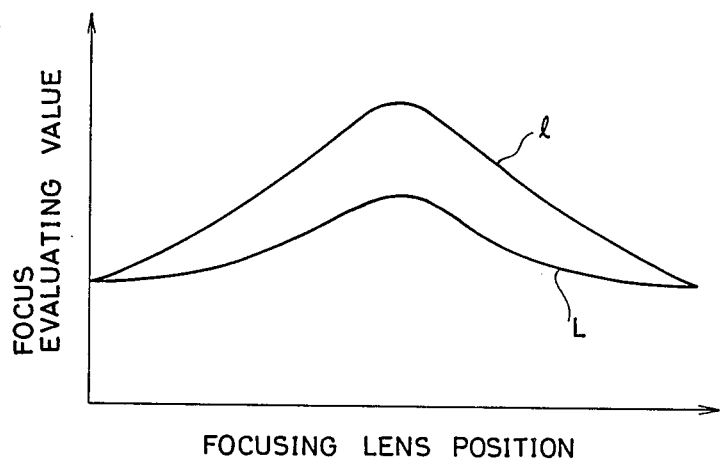

FIGS. 11A and 11B are graphs for explaining such a state in which an image is recorded in a dark place, where FIG. 11A corresponds to the case in which the AGC circuit is not operated and FIG. 11B corresponds to the case in which the AGC circuit is operated. In each of the drawings, "L" denotes the output of the first focus evaluating value generating circuit and "l" denotes the output of the second focus evaluating value generating circuit. In addition, in each of the drawings, an axis of abscissa represents the position of the focusing lens, that is, the distance between the lens and the object and an axis of ordinate represents the focus evaluating value.

As can be seen from FIG. 11A, if and when the AGC circuit is not operated, the shape of the curve of the output "L" of the first focus evaluating value generating circuit is steep but the level itself is extremely small as a whole. On the other hand, in FIG. 11B, since the AGC circuit is operated, noise at a low level in the output of the first focus evaluating value generating circuit, which is not shown in FIG. 11A, is amplified, so that the level of the output "L" of the first focus evaluating value generating circuit is largely increased as a whole and the curve thereof becomes slightly gentler.

As one means for solving the above described problems, an approach of removing a constant DC bias component from an output of a video signal and then, detecting and integrating the output of the video signal is considered. This approach has an advantage that the noise component is significantly removed and the shape of a curve of the focus evaluating value becomes steep.

However, when the luminance of the object becomes extremely low, the signal level is equal to or less than the noise level. Since the noise component in such a case includes a lot of high frequency components, the output "L" of the first focus evaluating value generating circuit is sufficiently large as shown in FIG. 11B but becomes extremely unstable due to noise. The above described approach by DC bias cutting cannot sufficiently cope with such a situation. As a result, as described above, according to an approach of selecting an automatic focusing operation in response to the output of the first focus evaluating value generating circuit after it is determined that the output of the first focus evaluating value generating circuit exceeds a predetermined reference value, a malfunction may rather occur. In other words, when an object having extremely low luminance is recorded, a large noise level exists, so that the output of the first focus evaluating value generating circuit becomes sufficiently large but the shape of the curve is always changed, that is, becomes extremely unstable. Thus, a malfunction occurs in which the automatic focusing operation is resumed although the object is not changed.

According to a third embodiment of the present invention, an automatic focusing operation responsive to the output of the second focus evaluating value generating circuit which is immune to noise is automatically selected when an image is recorded in a dark place.

Figure 12:
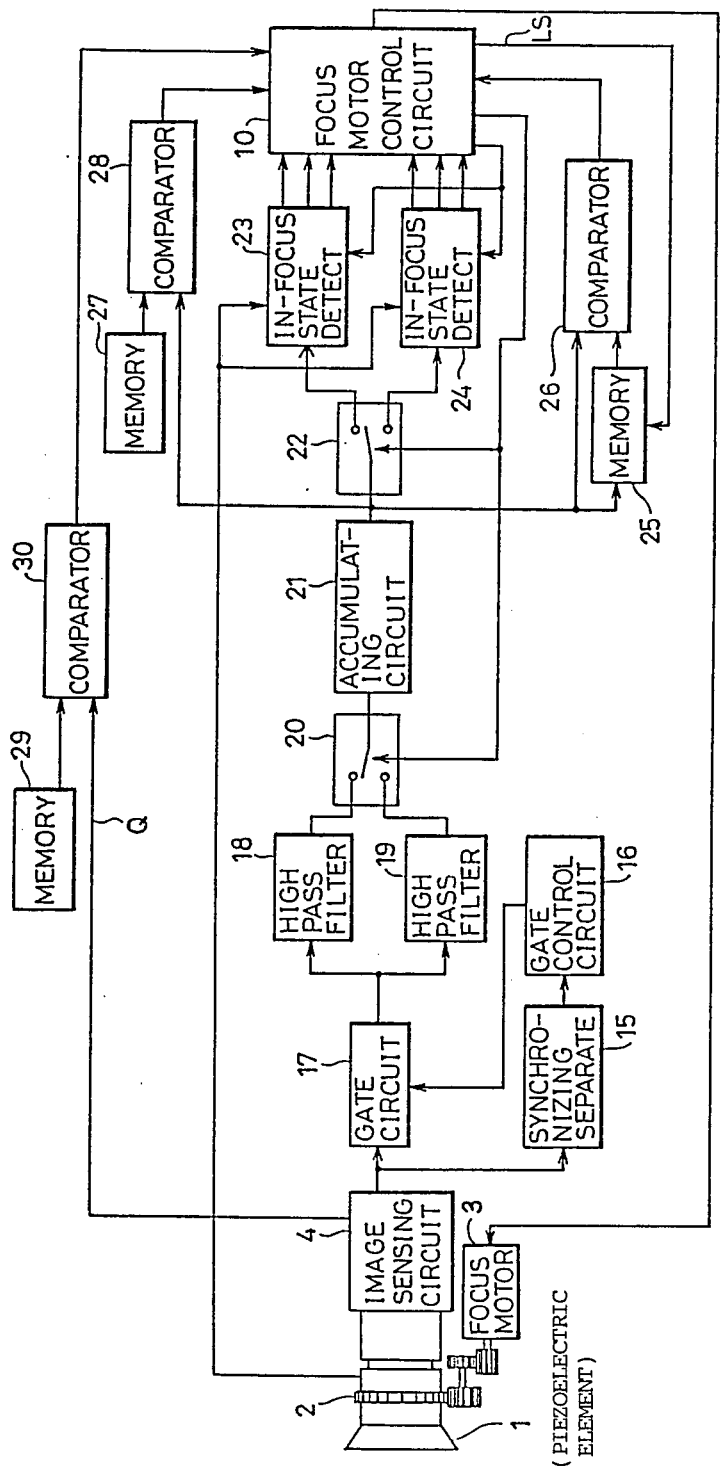
FIG. 12 is a schematic block diagram showing still another embodiment of the present invention.

FIG. 12 is a schematic block diagram showing an automatic focusing circuit according to the third embodiment of the present invention. The automatic focusing circuit shown in FIG. 12 is the same as the automatic focusing circuit according to the embodiment shown in FIG. 7 except for the following.

More specifically, a video signal extracted from a part of an image sensing circuit 4 is smoothed as described below and then, applied to a comparator 30 as a signal Q indicating that an image is recorded in a dark place. The comparator 30 compares the dark place determination signal Q with a reference voltage outputted from a reference voltage generating circuit 29. If the dark place determination signal Q is smaller than the reference voltage, the comparator 30 outputs a signal at an "H" level and applies the same to a focusing motor control circuit 10. If the dark place determination signal Q is larger than the reference voltage, the comparator 30 outputs a signal at an "L" level and applies the same to the focusing motor control circuit 10.

A video signal for generating the dark place determination signal Q may be extracted from a suitable place in the image sensing circuit 4. For practical use, it is appropriate that a video signal to be inputted to the AGC circuit is extracted.

Figure 13:
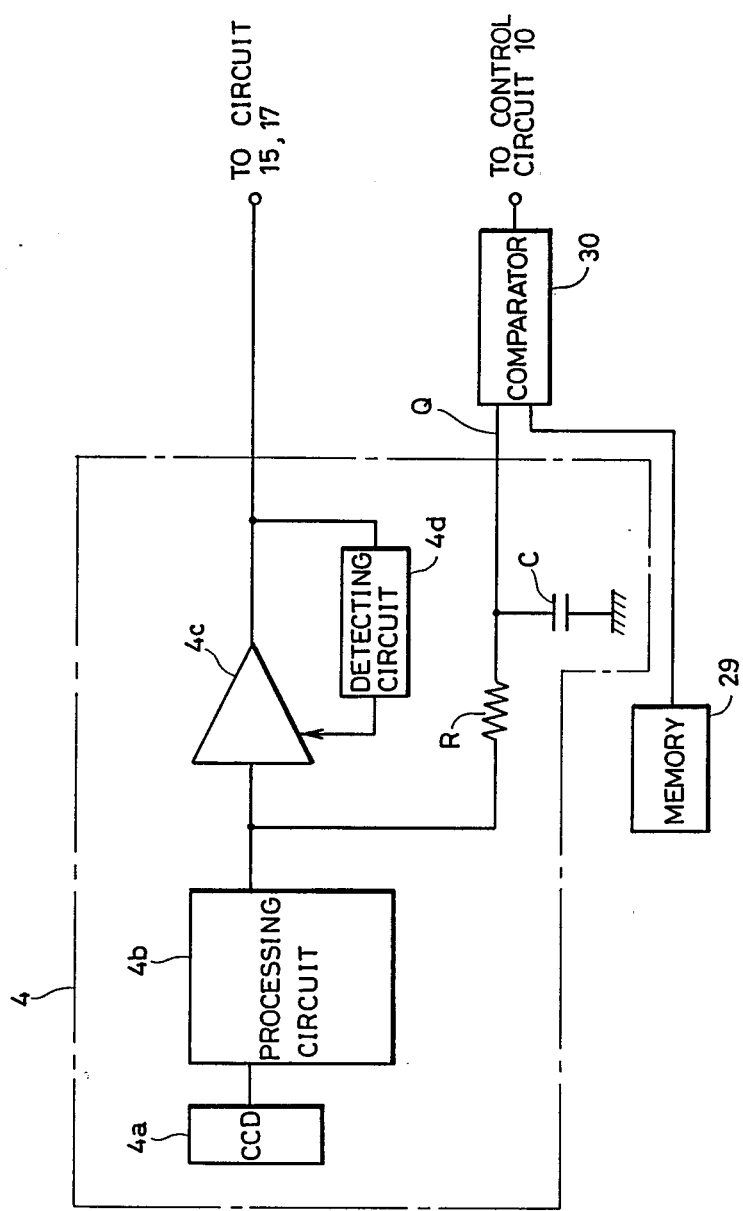
FIG. 13 is a block diagram showing the details of an image sensing circuit 4 shown in FIG. 12.

FIG. 13 is a block diagram showing the details of the image sensing circuit 4 capable of generating the dark place determination signal Q.

Referring to FIG. 13, the image sensing circuit 4 comprises an image sensor 4a such as a CCD, a circuit 4b for processing an output of the image sensor and an AGC amplifier 4c. An output of the image sensor 4a is converted into a video signal by the processing circuit 4b and then, inputted to the AGC amplifier 4c. The AGC amplifier 4c is controlled by a feedback operation of a detecting circuit 4d such that an output of the AGC amplifier 4c attains a predetermined constant level. The output of the AGC amplifier 4c is applied to a synchronizing separator circuit 15 and a gate circuit 17 in the subsequent stage. In addition, an output of the image sensor output processing circuit 4b is smoothed by a smoothing circuit comprising a resistor R and a capacitor C, outputted as the dark place determination signal Q and applied to the comparator 30. The reference voltage level of the reference voltage generating circuit 29 should be suitably set in consideration of the noise level of the video signal. More specifically, the reference voltage level is set to approximately a level in which a signal (low light signal) indicating the lack of quantity of light is generally produced in a video camera.

The focusing motor control circuit 10 performs an automatic focusing operation in response to the output of the first focus evaluating value generating circuit as in the above described first and second embodiments while it receives a signal at the "L" level from the comparator 30. When it receives a signal at the "H" level from the comparator 30, the focusing motor control circuit 10 switches the switching circuit 20 and 22 such that only the output of the second focus evaluating value generating circuit is passed irrespective of the output of the first focus evaluating value generating circuit and remains in this state until it newly receives a signal at the "L" level from the comparator 30.

Thus, in the automatic focusing circuit shown in FIG. 12, it is automatically determined that an image is recorded in a dark place. If it is determined that an image is recorded in a dark place, an automatic focusing operation is performed in response to only the output of the second focus evaluating value generating circuit which is immune to noise. Consequently, when an image is recorded in a dark place, a malfunction due to a large noise component does not occur, so that an extremely stable automatic focusing operation can be performed.

Although in the above described third embodiment, it is determined in response to the video signal extracted from the image sensing circuit that an image is recorded in a dark place, it may be determined using an independent sensor.

Although in the above described embodiments, a case was described in which a signal which takes the maximum value in the in-focus position is employed as a focus evaluating value, a signal which takes the minimum value in the in-focus position may be employed as a focus evaluating value and a circuit for detecting the minimum value may be provided so that the minimal value of the detected value is controlled to be maintained, in which case the same effect can be obtained.

In addition, although in the above described embodiments, the integration circuit 5f of an analog type was employed, an integration circuit of a digital type containing an A/D converter can be employed.

Furthermore, operations according to the above described embodiments can be easily processed in a software manner by a microprocessor.

Additionally, although in the above described embodiment, the focusing ring position signal generated from the focusing ring 2 was held in the focusing ring position memory 23e so that a focusing ring position signal corresponding to the maximum value of the focus evaluating value and the current focusing ring position signal are compared with each other by the comparator 23f, the focusing motor position signal may be detected from the focusing motor 3 and substituted for the focusing ring position signal, in which case the same effect can be obtained.

Additionally, focus evaluating values may be detected not every one field but every one frame.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An automatic focusing circuit for automatically matching the focus relative to an object in response to a video signal obtained from image sensing means having a focusing lens and an image sensor, comprising:
relative position changing means (2, 3) for changing the relative position in the direction of an optical axis of said focusing lens relative to said image sensor,
first focus evaluating value detecting means (15, 16, 17, 18, 21) for detecting a level of a first pre-determined high frequency component of the video signal obtained from said image sensing means every constant time period, converting the level into a first focus evaluating value which is steeply changes at a first slope in response to the change of the relative position of said focusing lens and supplying the same, second focus evaluating value detecting means (15, 16, 17, 19, 21) for detecting a level of a second pre-determined high frequency component of the video signal obtained from said image sensing means every constant time period, converting the level into a second focus evaluating value which is gently changes at a second slope in response to the change of the relative position of said focusing lens and supplying the same, wherein the value of the second slope is generally less than the value of the first slope;

both said first and second focus evaluating values being a focus evaluating value the absolute value of which takes the maximum value in the in-focus position, first control means (23, 10) responsive to said first focus evaluating value for controlling said relative position changing means so that the relative position of said focusing lens is driven to the position where the absolute value of said first focus evaluating value takes the maximum value, second control means (24, 10) responsive to said second focus evaluating value for controlling said relative position changing means so that the relative position of said focusing lens is driven to the position where the absolute value of said second focus evaluating value takes the maximum value, means (27, 28) for determining that the absolute value of said first focusing evaluating value is larger than a predetermined reference value, and switching control means (10, 20, 22) responsive to an output of said determining means for selecting said first control means or said second control means to control said relative position changing means such that said second control means is selected to control said relative position changing means; when the absolute value of said first focus evaluating value is smaller than said reference value and said first control means is selected to control said relative position changing means means when the absolute value of said first focus evaluating value is larger than said reference value.

2. An automatic focusing circuit according to claim 1, wherein said switching control means comprises switching means (20, 22) for switching said first and second focus evaluating values outputted from said first and second focus evaluating value detecting means every said constant time period, respectively and alternately applying the same to said first and second control means.

3. An automatic focusing circuit according to claim 2, wherein said switching control means fixes said switching means so that only said first focus evaluating value is selected and applied to said first control means when the absolute value of said first focus evaluating value is larger than said reference value.

4. An automatic focusing circuit according to claim 1, wherein said first control means comprises means (23) for controlling said relative position changing means so that the relative position of said focusing lens is fixed once in the position where the absolute value of said first focus evaluating value takes the maximum value, and said second control means comprises means (24) for controlling said relative position changing means so that the relative position of said focusing lens is fixed once in the position where the absolute value of said second focus evaluating value takes the maximum value, and which further comprises object change detecting means (25, 26) responsive to a change in said first focus evaluating value or said second focus evaluating value for detecting a change of said object, said switching control means always selecting said second control means to resume control of the relative position of said focusing lens when said object change detecting means detects the change of said object.

5. An automatic focusing circuit according to claim 1, which further comprises dark place detecting means (4, 29, 30) for determining that said object is in a dark place wherein said object is not substantially illuminated;

said switching control means always selecting said second control means to control said relative position changing means when said dark place detecting means determined that said object is in a dark place.

6. An automatic focusing circuit according to claim 5, wherein said dark place detecting means comprises means (29) for supplying a predetermined reference signal, and first comparing means (30) for comparing the level of the video signal obtained from said image sensing means with said predetermined reference signal.

7. An automatic focusing circuit according to claim 1, comprising synchronizing signal separating means (15) utilized within both said first and second focus evaluating means for separating a vertical synchronizing signal and a horizontal synchronizing signal from said video signal, and gate means (16, 17) for passing every said constant time period said video signal within a sampling area set in response to said vertical synchronizing signal and said horizontal synchronizing signal separated from said synchronizing signal separating means.

8. An automatic focusing circuit according to claim 7, wherein said first focus evaluating value detecting means comprises first filtering means (18) for extracting a level of the first pre-determined high frequency component in the video signal which passed through said gate means, and said second focus evaluating value detecting means comprises second filtering means (19) for extracting a level of the second pre-determined high frequency component including a component at a level which is lower than the level of said first pre-determined high frequency component in the video signal which passed through said gate means.

9. An automatic focusing circuit according to claim 8, further comprising means (21), utilized within both said first and second focus evaluating means, for integrating the level of the first or second pre-determined high frequency components of the video signal extracted by said first or second filtering means and for converting the integrated level into a digital signal.

10. An automatic focusing circuit according to claim 1, wherein said relative position changing means comprises a focusing ring (2) and a focusing motor (3) for moving the focusing lens in the direction of the optical axis.

11. An automatic focusing circuit according to claim 1, wherein said relative position changing means comprises a piezoelectric element for moving the focusing lens or the image sensor in the direction of the optical axis.

12. An automatic focusing circuit according to claim 1, wherein said constant time period is a time period corresponding to one field of said video signal.

13. An automatic focusing circuit according to claim 1, wherein said constant time period is a time period corresponding to one frame of said video signal.

* * * * *